Sept. 21, 1948.  A. G. MOULSDALE ET AL  2,449,564
EYEPIECE ADAPTER
Filed Feb. 2, 1944  2 Sheets-Sheet 1
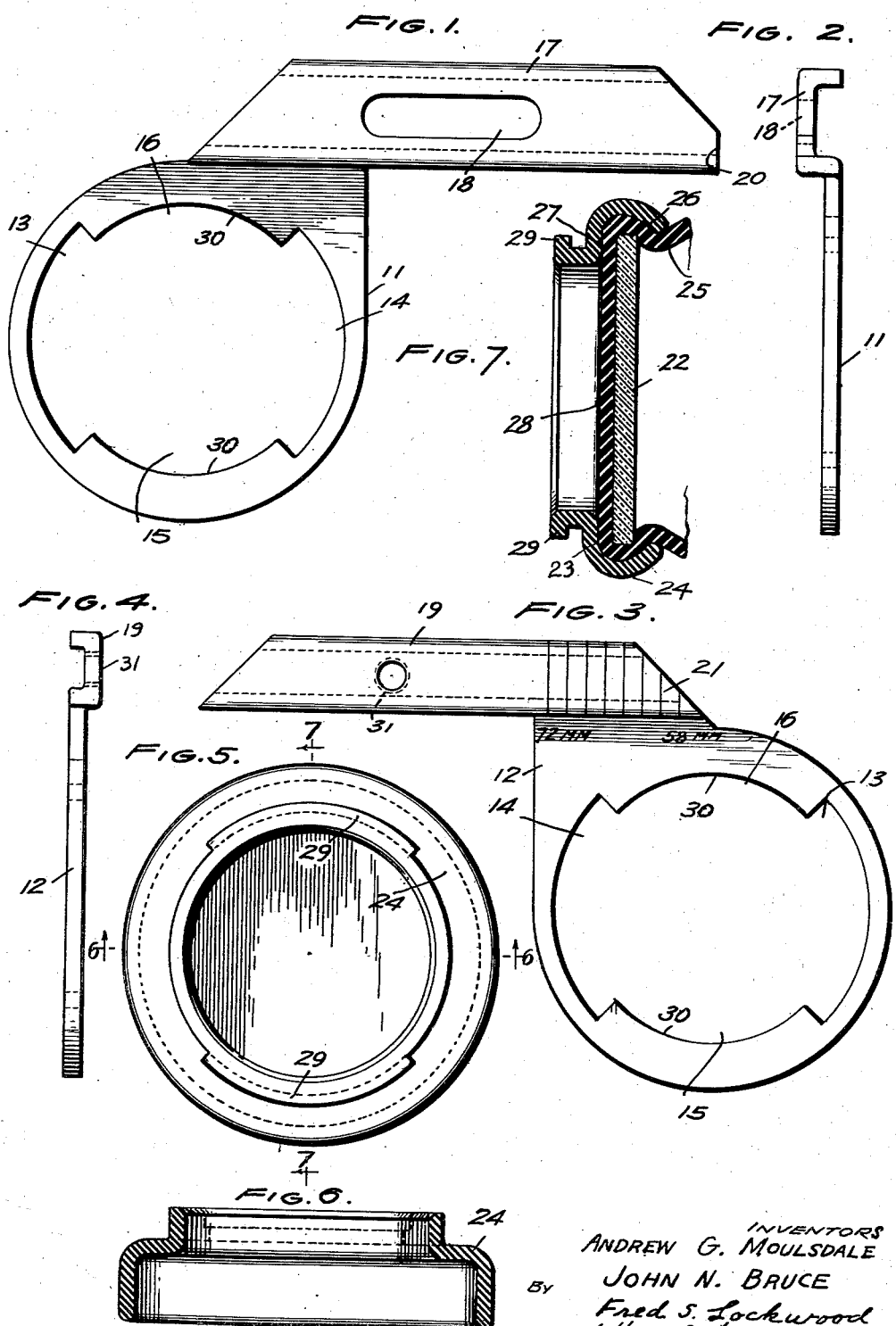
INVENTORS
ANDREW G. MOULSDALE
JOHN N. BRUCE
By Fred S. Lockwood
and Henry Bek ATTORNEYS Sept. 21, 1948. A. G. MOULSDALE ET AL 2,449,564
EYEPIECE ADAPTER
Filed Feb. 2, 1944 2 Sheets-Sheet 2
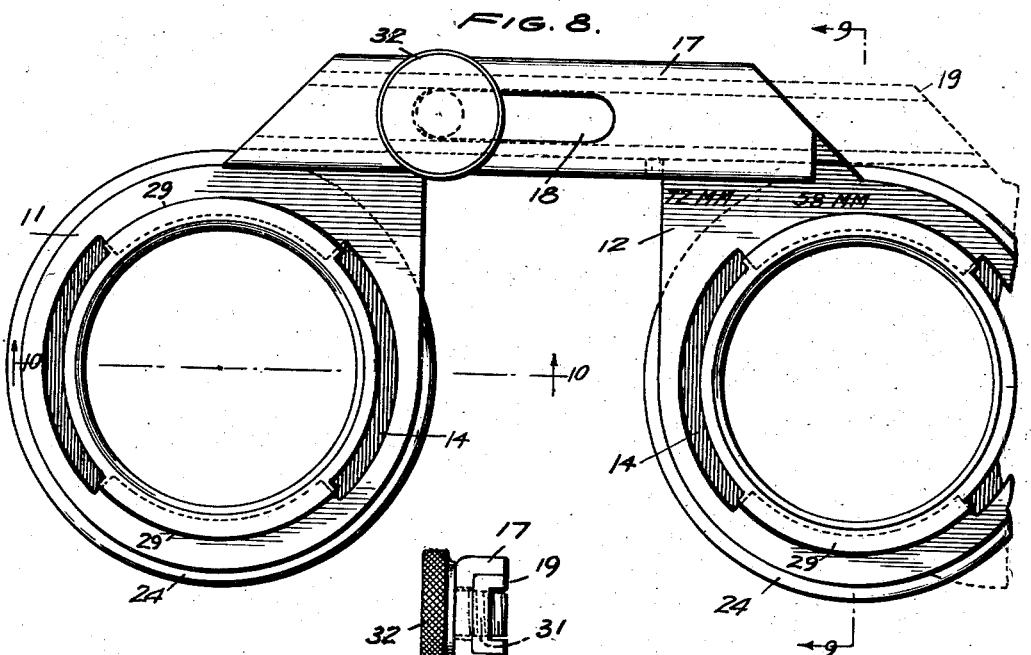
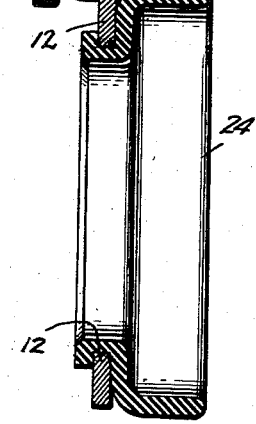
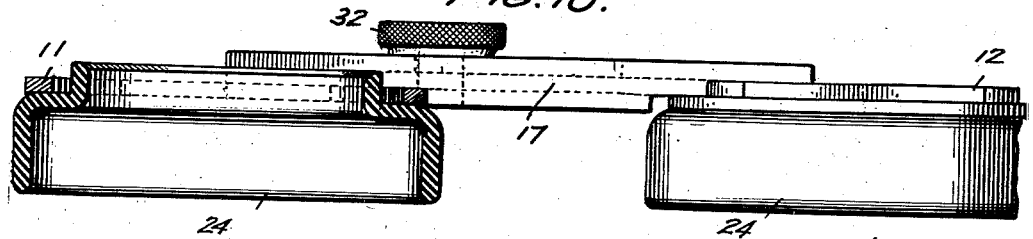
INVENTORS
ANDREW G. MOULSDALE
JOHN N. BRUCE
BY Fred S. Lockwood
and Henry Berk ATTORNEYS Patented Sept. 21, 1948

2,449,564

UNITED STATES PATENT OFFICE 2,449,564

EYEPIECE ADAPTER

Andrew G. Moulsdale, Abingdon, and
John N. Bruce, Baltimore, Md.

Application February 2, 1944, Serial No. 520,820

1 Claim. (Cl. 128—140)

(Granted under the act of March 3, 1883, as
amended April 30, 1928; 370 O. G. 757)

The invention described herein may be manufactured and used by or for the Government for governmental purposes without the payment to us of any royalty thereon.

This invention relates to an adapter for adjusting the interpupillary distance between eyepieces in optical gas masks.

Optical gas masks are designed to be worn by those required to use optical instruments, such as range finders and binoculars. The pairs of eyepieces in these masks are required generally to be small, flat, and in the same plane so that no light can penetrate to the eyes of the wearers except through the instrument employed at the time.

In order to accommodate various faces for the best vision, some means is necessary for adjusting and fixing the interpupillary distances of the lenses in the optical masks.

Although numerous eyepieces in gas masks made here and abroad have been examined, the nearest approach to the adjusting means provided by the present invention is an arrangement in which ring members are attached to eyerings by threaded washers and these ring members are moved apart or brought closer together by a screw threaded at both ends. These threaded parts require painstaking machining. They are difficult to make and assemble; also, they are readily subject to damaging by rough usage.

An object of this invention is to provide a simplified eyepiece adjustment means that can be readily manufactured, assembled and adjusted.

Another object of this invention is to provide an eyepiece adjustment means or adapter which is rugged, quickly attachable, and quickly adjustable. Additional objects will become apparent from the following description.

The eyepiece adjustment means of the present invention in a preferred form comprises an adjustable frame in two holder parts for left and right eyerings with a single locking thumb screw. The holders have a sliding channel connection with which they can be quickly spaced to the desired interpupillary distance. They have cut-out segments of different diameters so that they can be slipped quickly onto eyerings in a mask, then merely by about a quarter turn become clutched or engaged to the eyerings having corresponding projections.

A more detailed description will be given with reference to the accompanying drawings, in which Figure 1 shows a front view of the right holder; Figure 2, a side view of the right holder; Figure 3, a front view of the left holder; Figure 4, a side view of the left holder; Figure 5, a front view of an eyering; Figure 6, a sectioned side view of the eyering; Figure 7, a sectioned side view of the eyering fixed in an optical mask; Figure 8, a front view of the adjustment frame assembly attached to a pair of eyerings; Figure 9, a sectioned side view of the assembly; and Figure 10, a partly sectioned bottom view of the assembly.

Referring particularly to Figure 1 and Figure 3, the holder rings 11 and 12 have cut or punched out segments of nearly equal angular portions. Segments 13 and 14 have equally somewhat larger angles and diameters than segments 15 and 16.

An upper channel member 17 integrally attached to the holder ring 11 has a slot opening 18 wide enough for sliding of the channel past a thumb screw stem and long enough for adjustment through a range of about 58 to 72 mm.

Upper channel member 19, Figure 3, integrally attached to left holder ring 12 has a centrally located threaded opening 31 into which the locking thumb screw 32, Figure 9, has been inserted and secured by expanding the free end to fasten the two channel members in a fixed position as shown in Figures 8, 9 and 10. The interpupillary distance may be set as needed by sliding the right holder channel 17 over the inner channel 19 until the vertical edge 20 coincides with the proper marking of the scale 21 on the front of the channel 19, then tightening the thumb screw 32.

Referring to Figures 5, 6 and 7, glass lenses 22 may be inserted from within a mask and pressed forwardly against the shoulders 23 of the eyerings 24, a portion 25 of the rubber or fabric of the mask facepiece acting as a gasket to cushion the glass. The body portion 24 of the eyering is swaged over the lens 22 and covering portion of the facepiece 25, thus firmly holding each lens in place, the facepiece material being compressed at 26 and 27 to form a gas-tight seal around the lens. A suitable lubricant, such as zinc stearate, may be used to facilitate the swaging of the eyering over the lens.

After the lens is firmly clamped by the swaged eyering, the disc facepiece material 28 may be cut away from in front of lens by a rotary cutter lubricated by water to leave the lens exposed on both sides as shown in Figure 5.

The eyerings 24 have projections 29 which correspond approximately to projections 30 of the holders in angular measurement. The larger angular measurement of the segments 13 and 14 in the holders permits the holders to be quickly slipped on over the eyerings by having these larger segment openings pass over the projections 29. Then by turning each holder about 90° to a normally seated position, the projections 30 of the holders are clutched or held behind the projections 29 of the eyerings. The channel members are at the same time brought together and then can be locked at the desired position by screwing in the thumb screw 32.

The adjustment frame, when assembled to the mask, is in a secure position since the projections 29 retain the holder projections 30. From Figure 10, it may be seen that the holder rings 11 and 12 do not bind to the eyerings. The arrangement shown with sufficient tolerance between the retaining projections 29 and holder projections 30 allows the holder rings to be rotated in their mountings on the eyerings for easy assembly and to avoid strain on the facepiece when the frame is adjusted.

Removal of the adapter from the eyerings is likewise simple, since the adapter comprises a frame in two parts which can be disengaged one from the other and from the eyerings by removal of the single fastener, the threaded screw 32, and merely rotating the two parts of the frame on the eyerings until the inward projections 30 can pass unobstructed through indentations or openings between projections 29 on the eyerings.

The eyepieces can be adjusted to the correct interpupillary distance for the wearer by moving the holders apart or together with thumb screw loose until the straight edge is at the proper gradation of the scale. These gradations may be marked in any desired divisions, such as 1 or 2 millimeter gradations. Also, finer adjustments can be made.

It is advantageous to have the facepiece of an optical mask so molded that the eyepieces are at a minimum interpupillary distance without compressing the facepiece, and at a maximum interpupillary distance with a reasonable amount of stretching.

The sliding crossbar members and connecting fastener for spacing and fixing the holders may have various simplified forms. Also, the holders may be varied in form, as for example, to suit the configurations of eyerings having different shapes and sizes. It is to be understood that various modifications come within the spirit and scope of the invention.

An eyepiece adjusting frame of the quickly attachable and adjustable type herein described was assembled to a streamlined optical facepiece and was tested in connection with the firing of heavy artillery. The test showed that the frame functioned satisfactorily.

We claim:

An adapter of the class described, comprising in combination: a bridge member having a lens-frame member extending below one end of said bridge member, the junction of said bridge member and said frame member being in extent substantially of the order of the radius of said frame member, a right-angle transverse edge at the other end of said bridge member, and a rearwardly projecting flange extending along each of the longitudinal margins of said bridge member; a companion bridge member having a companion lens-frame member positioned below the opposite end of said companion bridge member, and a pair of like flanges arranged to slidably interfit with said first-mentioned flanges; each of said bridge members being in extent substantially of the order of the diameter of said frame member; an indicia scale arranged along said opposite end of said companion bridge member for cooperation with said edge; and means for holding said bridge members in selective longitudinal adjustment with each other, said holding means being arranged for coaction with said scale and with said flanges to maintain rigid alignment and interpupillary distances between said frame members.

ANDREW G. MOULSDALE.
JOHN N. BRUCE.

REFERENCES CITED

The following references are of record in the file of this patent:

UNITED STATES PATENTS

| Number | Name | Date |
| --- | --- | --- |
| 721,773 | Beebe | Mar. 3, 1903 |
| 1,269,498 | Parsons | June 11, 1918 |
| 2,064,812 | Bouchard | Dec. 22, 1936 |